United States Patent
Gupta et al.

(10) Patent No.: US 10,936,510 B2
(45) Date of Patent: Mar. 2, 2021

(54) LOCKING KEY SECONDARY ACCESS SYSTEM

(71) Applicant: Dell Products L. P., Round Rock, TX (US)

(72) Inventors: Chitrak Gupta, Bangalore (IN); Sushma Basavarajaiah, Sanjaynagar (IN); Rama Rao Bisa, Bangalore (IN); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/258,403

(22) Filed: Jan. 25, 2019

(65) Prior Publication Data
US 2020/0242052 A1     Jul. 30, 2020

(51) Int. Cl.
| | |
|---|---|
| *G06F 12/00* | (2006.01) |
| *G06F 12/14* | (2006.01) |
| *G06F 21/78* | (2013.01) |
| *G06F 21/62* | (2013.01) |
| *H04L 29/06* | (2006.01) |
| *G06F 21/60* | (2013.01) |
| *H04W 84/12* | (2009.01) |

(52) U.S. Cl.
CPC ...... *G06F 12/1466* (2013.01); *G06F 12/1408* (2013.01); *G06F 21/604* (2013.01); *G06F 21/6218* (2013.01); *G06F 21/78* (2013.01); *H04L 63/06* (2013.01); *H04L 63/18* (2013.01); *G06F 2212/1052* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,266,433 B1 * | 9/2012 | Przykucki | H04L 67/1097 380/286 |
| 2008/0232598 A1 * | 9/2008 | Vennelakanti | G06F 21/602 380/279 |
| 2015/0201317 A1 | 7/2015 | Kuusilinna et al. | |

OTHER PUBLICATIONS

"The Definitive Guide to Encryption Key Management Fundamentals—What Is Encryption Key Management?," 39 Pages, Townsend Security, https://info.townsendsecurity.com/definitive-guide-to-encryption-key-management-fundamentals.

* cited by examiner

*Primary Examiner* — Daniel D Tsui
(74) *Attorney, Agent, or Firm* — Haynes and Boone, LLP

(57) ABSTRACT

A locking key secondary access system includes a key management system coupled to a secondary locking key access device and a server device via a network. The server device includes a managed device. The server device receives a request to unlock the managed device, and determines that a first access path via a first communication subsystem and through the network to the key management system is unavailable. In response, the server device provides locking key request information via a second communication subsystem to the secondary locking key access device. The secondary locking key access device may use the locking key information to retrieve a locking key for the managed device from the key management system. The secondary locking key access device sends the locking key to the server device via the second communication subsystem, and the server device uses the locking key to unlock the managed device.

17 Claims, 12 Drawing Sheets

LOCKING KEY SECONDARY ACCESS SYSTEM

BACKGROUND

The present disclosure relates generally to information handling systems, and more particularly to providing secondary access path(s) to retrieve locking keys for information handling systems when a primary access path is unavailable.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices included in the server system with device locking keys. For example, for many datacenter server systems, network-based key management systems have been developed to provide for the centralized management of storage device locking keys used to lock storage devices in the server systems in order to protect the data stored thereon, with the server systems configured to retrieve those storage device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system), and use those storage device locking keys to unlock storage devices in order to access the data stored thereon. However, the locking of storage devices via storage device locking keys can raise issues.

For example, server systems are often connected to the key management system via a switch device, and in the event the switch device goes down or otherwise becomes unavailable, those server systems will be unable to connect to the key management system in order to retrieve the storage device locking keys needed to unlock their storage devices. As such, any unavailability of the network connection to the key management server (e.g., resulting from the switch device unavailability discussed above) will prevent the server system from unlocking its storage devices so that the server device may boot or otherwise initialize, access data, and/or perform other storage device enabled activities known in the art. As such, conventional systems for locking managed devices are dependent on a healthy/available network connection between the server systems that include the managed devices and the key management system that provides the locking keys to unlock those managed devices, and the unavailability of that network connection results in downtime for those server devices.

Accordingly, it would be desirable to provide a locking key secondary access system.

SUMMARY

According to one embodiment, an Information Handling System (IHS) includes a processing system; and a memory system that is coupled to the processing system and that includes instructions that, when executed by the processing system, cause the processing system to provide a remote access controller engine that is configured to: receive a request to unlock a managed device; determine that a first access path through a network to a key management system, which is available via a first communication subsystem that is coupled to the processing system, is unavailable; provide, in response to determining that the first access path is unavailable, first locking key request information to a secondary locking key access device via a second communication subsystem that is coupled to the processing system, wherein the locking key information is configured to provide for the retrieval of a locking key for the managed device from the key management system; receive, from the secondary locking key access device via the second communication subsystem, the locking key; and unlock the managed device using the locking key.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
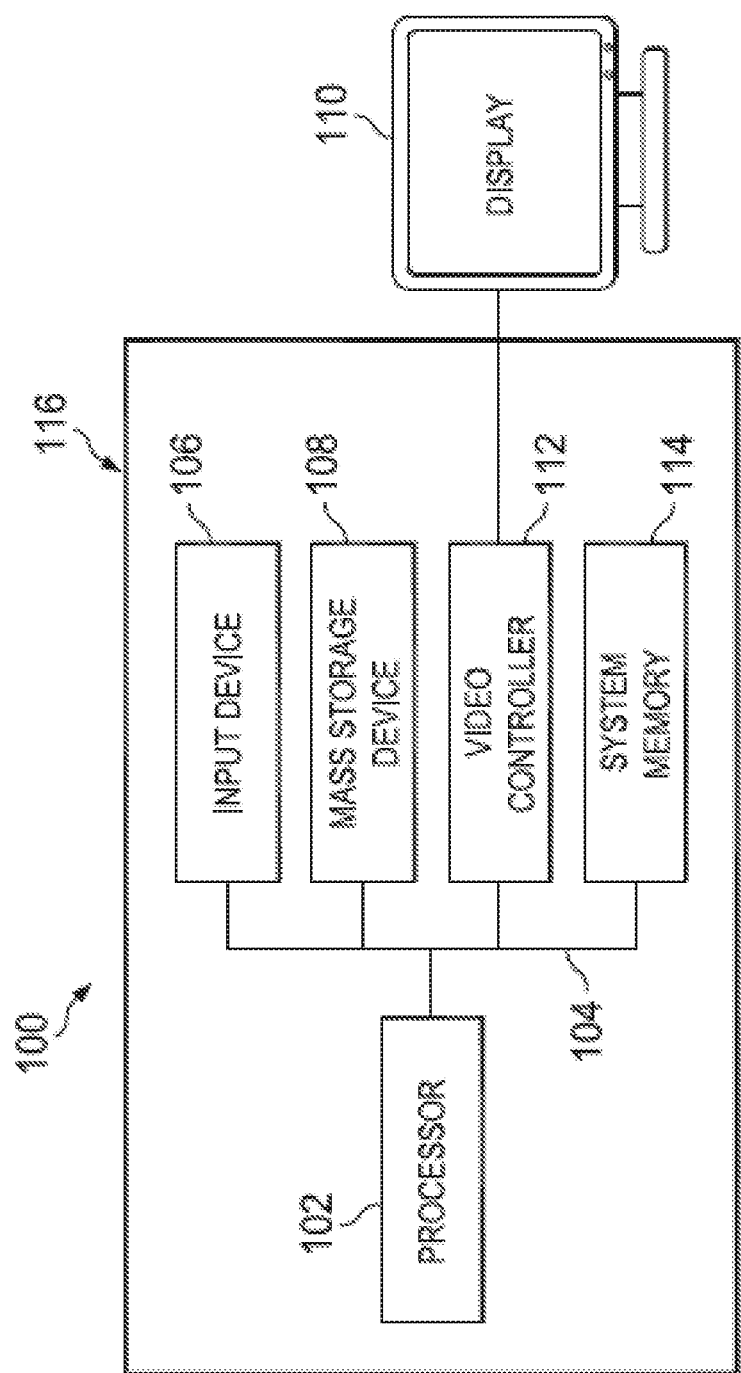
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
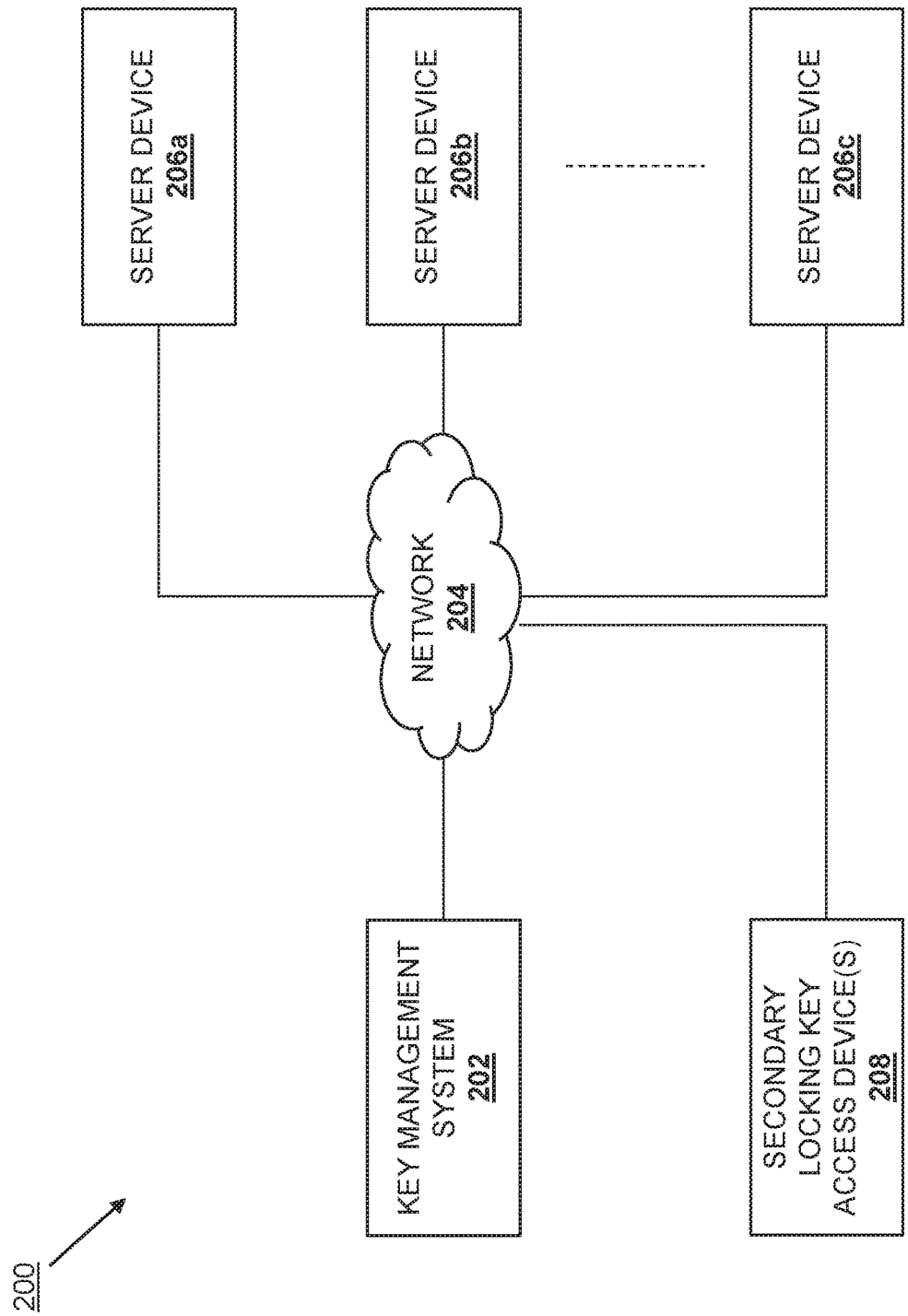
FIG. 2 is a schematic view illustrating an embodiment of a locking key secondary access system.

Referring now to FIG. 2, an embodiment of a locking key secondary access system 200 is illustrated. In the illustrated embodiment, the locking key secondary access system 200 includes a key management system 202 that may be provided by one or more key management server devices, any of which may be provided by the IHS 100 discussed above with reference to FIG. 1, and/or may include some or all of the components of the IHS 100. For example, the key management system 200 may be provided by server device(s) operating according to the Key Management Interoperability Protocol (KMIP) to provide a KMIP server. One of skill in the art in possession of the present disclosure will recognize that the KMIP is an extensible communication protocol that defines message formats for the manipulation of cryptographic keys via server device(s) providing the key management system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management server system 202 is coupled to a network 204 that may be provided by a Local Area Network (LAN), the Internet, and/or any other network that would be apparent to one of skill in the art in possession of the present disclosure. As discussed in further detail below, the network 204 may be provided by one or more switch devices that are coupled to the key management system 202, although other networking devices may be utilized in place of, or in addition to, the switch devices discussed below while remaining within the scope of the present disclosure as well. Furthermore, a plurality of managed systems may be coupled to the key management system 202 of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206a, 206b, and up to 206c, each of which is coupled through the network 204 to the key management system 202, and each of which may operate as a KMIP client.

In some of the embodiments discussed below, each of the server devices 206a-c may be coupled to a respective switch device that operates to provide the network 204 and that couples that server device to the key management system 202. For example, a first switch device may couple one or more server devices (that include the server device 206a) to the key management system 202, a second switch device that is different than the first switch may couple one or more server devices (that include the server device 206b) to the key management system 202, and third switch device that is different than the first switch and the second switch may couple one or more server devices (that include the server device 206c) to the key management system 202. In addition, as discussed below, the server devices 206a-c may include secondary communication subsystems that enable direct communication between themselves and/or other devices when their respective switch devices (or communication links with those switch devices) are unavailable.

In the illustrated embodiment, one or more secondary locking key access devices 208 are coupled to or included as part of the network 204. Any of the secondary locking key access devices 208 may be provided by the IHS 100 discussed above with reference to FIG. 1, and/or may include some or all of the components of the IHS 100. In the specific examples discussed below, the secondary locking key access devices 208 may be provided by networking devices (e.g., networking routers, networking access points, networking beacons, etc.), computing devices (e.g., desktop computing devices, laptop/notebook computing devices, tablet computing devices, mobile phones, etc.), and/or any other device with the communication capabilities described for the secondary locking key access device(s) 208 below. While one of skill in the art in possession of the present disclosure will recognize that the embodiment discussed below describe a datacenter including a datacenter network that couples together the key management system, the managed systems, and the secondary locking key access device(s), any of a variety of managed systems may be coupled to a key management system via a network while operating according to the teachings of the present disclosure, and those embodiments are envisioned as falling within the scope of the present disclosure as well.

Figure 3:
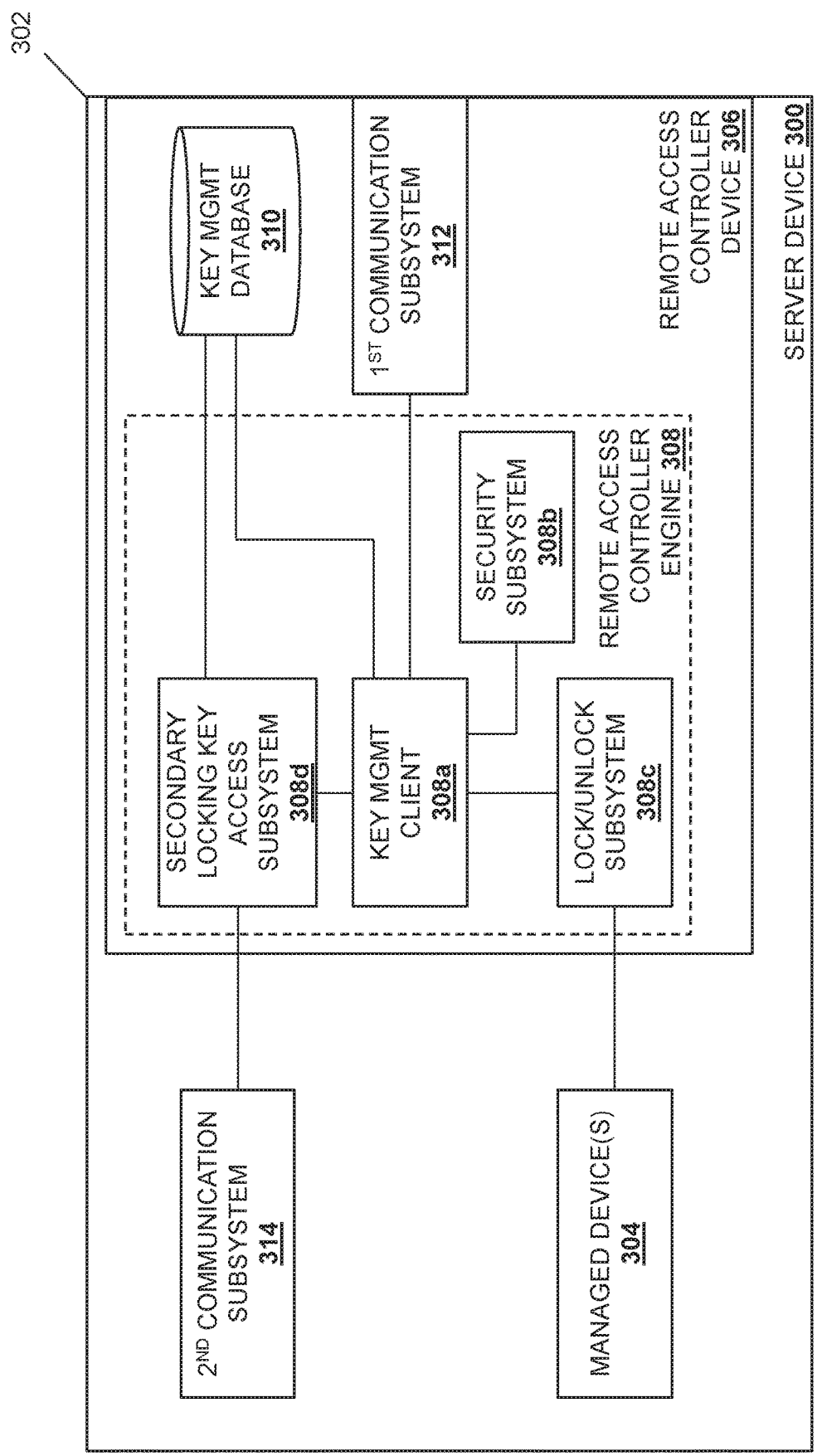
FIG. 3 is a schematic view illustrating an embodiment of a server device that may be provided in the locking key secondary access system of FIG. 2.

Referring now to FIG. 3, an embodiment of a managed system provided by a server device 300 is illustrated. The server device 300 may be any or all of the server devices 206a-c discussed above with reference to FIG. 2 and, as such, may be provided by the IHS 100 discussed above with reference to FIG. 1, and/or may include any or all of the components of the IHS 100, and in specific examples may be configured to operate as a KMIP client. In the illustrated embodiment, the server device 300 includes a chassis 302 that houses the components of the server device 300, only some of which are illustrated in FIG. 3. In the illustrated embodiment, the chassis 302 houses one or more managed devices 304. In the examples provided below, the managed devices 304 are provided by storage devices. However, one of skill in the art in possession of the present disclosure will recognize that the managed devices 304 may be provided by any devices that are configured to be locked and unlocked using the device locking keys provided via the key management system 202, discussed above.

In the illustrated embodiment, the chassis 302 also houses a remote access controller device 306 that is coupled to each of the managed devices 304. In a specific example, the remote access controller device 306 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server system, while providing a browser-based-interface and/or command-line-interface for allowing users to manage and monitor the server system. As discussed below, the remote access controller device 306 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller engine 308 that is configured to perform the functionality of the remote access controller engines and/or remote access controller devices discussed below. As would be understood by one of skill in the art in possession of the present disclosure, the remote access controller processing system and the remote access controller memory system may be separate and distinct from a processing system (e.g., one or more Central Processing Units (CPUs)) and a memory system utilized by the server device 300.

In the illustrated embodiment, the remote access controller device 306 may also include a remote access controller storage system (not illustrated, but which may include the storage device 108 discussed above with reference to FIG. 1) that is coupled to the remote access controller engine 308 (e.g., via a coupling between the remote access controller processing system and the remote access controller storage system) and that includes a key management database 310 that is configured to store any of the information utilized by the remote access controller engine 308 and/or the remote access controller device 306 as discussed below. The remote access controller device 306 also includes a first communication subsystem 312 that is coupled to the remote access controller engine 308 (e.g., via a coupling between the remote access controller processing system and the first communication subsystem 312). In the examples below, the first communication subsystem 312 includes a Network Interface Controller (NIC) that is configured to communicate over the network 204, but may be provided by any other communication components (e.g., wireless communication components) that would be apparent to one of the skill in the art in possession of the present disclosure.

The remote access controller device 306 also includes a second communication subsystem 314 that is coupled to the remote access controller engine 308 (e.g., via a coupling between the remote access controller processing system and the second communication subsystem 314). In the examples below, the second communication subsystem 314 includes a wireless communication subsystem (e.g., a WiFi communication subsystem, a BLUETOOTH® communication subsystem, a Near Field Communication (NFC) subsystem, etc.), but may be provided by any other communication components (e.g., wired communication components such as a Network Interface Controller (NIC)) that may be configured to provide communication with the key management system, the server device(s), and/or secondary locking key access devices discussed below and that would be apparent to one of the skill in the art in possession of the present disclosure. As would be understood by one of skill in the art in possession of the present disclosure, the first communication subsystem 312 in the remote access controller device 306 may be separate and distinct from a communication subsystem utilized by the server device 300 (at least a portion of which may be provided by the second communication subsystem 314), and may provide an out-of-band communication path for the remote access controller device 306/server device 300 to devices/systems connected to the network 204.

In the illustrated embodiment, the remote access controller engine 308 is configured to provide a key management client 308a that is coupled to the key management database 310 (e.g., via a coupling between the remote access controller processing system and the remote access controller storage system) and to the first communication subsystem 312 (e.g., via a coupling between the remote access controller processing system and the first communication subsystem 312), and that may be configured to operate as a KMIP client to retrieve locking keys and perform other KMIP client functions as discussed below. The remote access controller engine 308 is also configured to provide a security subsystem 308b that is coupled to the key management client 308a and that may be configured to operate as a locking key retrieval request populator to assist the key management client 308a in retrieving locking keys as discussed below. The remote access controller engine 308 is also configured to provide a lock/unlock subsystem 308c that is coupled to the key management client 308c and configured to utilize locking keys retrieved by the key management client 308a in order to lock and unlock the managed device(s) 304.

The remote access controller engine 308 is also configured to provide a secondary locking key access subsystem 308d that is coupled to the key management client 308c, to the second communication subsystem 314 (e.g., via a coupling between the remote access controller processing system and the second communication subsystem 314), to the key management database 310 (e.g., via a coupling between the remote access controller processing system and the remote access controller storage system), and that is configured to operate as a network manager that provides the secondary access to locking keys discussed below. While a specific server device 300 has been illustrated and described, one of skill in the art in possession of the present disclosure will recognize that server devices may include a variety of components and/or component configuration for providing the functionality discussed below while remaining within the scope of the present disclosure as well. For example, the secondary locking key access functionality provided by the remote access controller device 306 discussed below may be provided by other components while remaining within the scope of the present disclosure as well.

Figure 4:
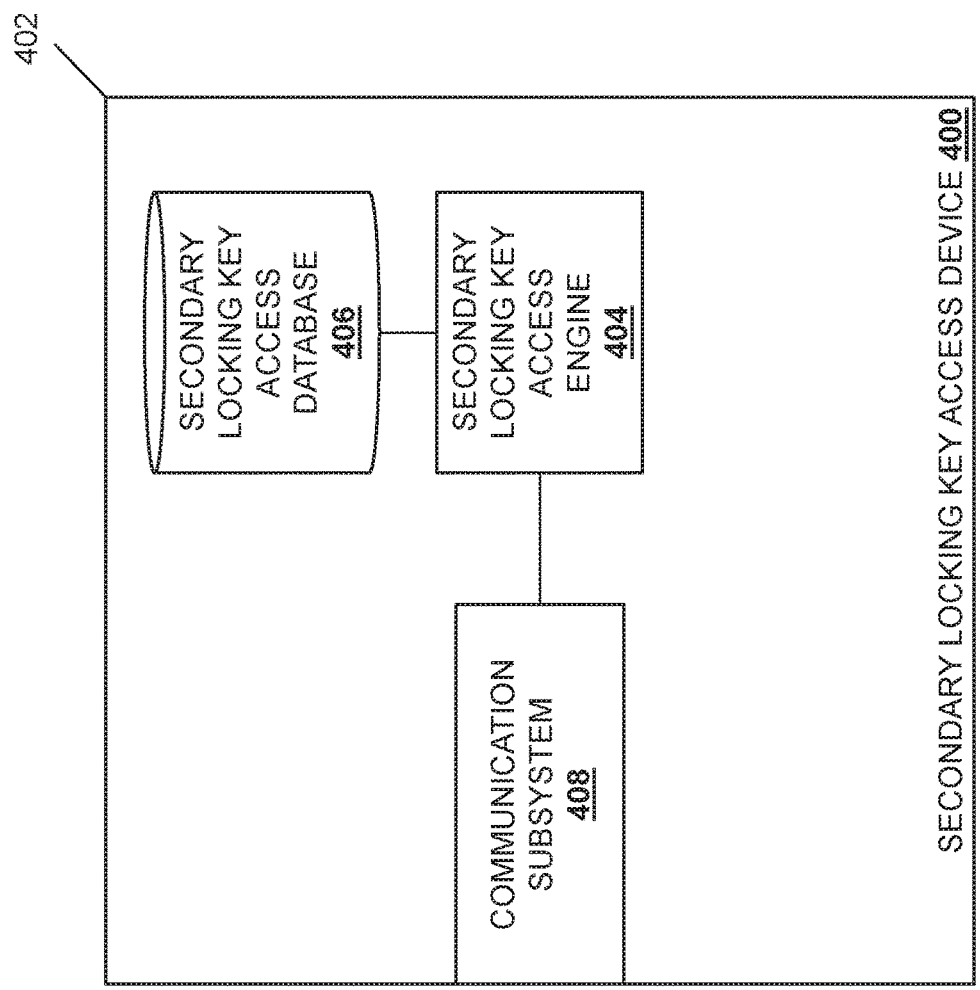
FIG. 4 is a schematic view illustrating an embodiment of a secondary locking key access device that may be provided in the locking key secondary access system of FIG. 2.

Referring now to FIG. 4, an embodiment of a secondary locking key access device 400 is illustrated. The secondary locking key access device 400 may be any or all of the secondary locking key access device(s) 208 discussed above with reference to FIG. 2 and, as such, may be provided by the IHS 100 discussed above with reference to FIG. 1, and/or may include any or all of the components of the IHS 100, and in specific examples may be provided by any of a variety of networking devices (e.g., networking routers, access points, etc.) or computing devices (e.g., desktop computing devices, laptop/notebook computing devices, etc.) that would be apparent to one of skill in the art in possession of the present disclosure. In the illustrated embodiment, the secondary locking key access device 400 includes a chassis 402 that houses the components of the secondary locking key access device 400, only some of which are illustrated in FIG. 4. For example, the chassis 402 may houses a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a secondary locking key access engine 404 that is configured to perform the functionality of the secondary locking key access engines and/or secondary locking key access devices discussed below.

The chassis 402 may also house a storage system (not illustrated, but which may include the storage device 108 discussed above with reference to FIG. 1) that is coupled to the secondary connection engine 404 (e.g., via a coupling between the processing system and the storage system) and that includes a secondary connection database 406 that is configured to store any of the information utilized by the secondary locking key access engine 404 and/or the secondary locking key access device 400 as discussed below. The chassis 402 may also house a communication subsystem 408 that is coupled to the secondary locking key access engine 404 (e.g., via a coupling between the processing system and the communication subsystem 408) and that may include a Network Interface Controller (NIC), a wireless communication subsystem (e.g., a WiFi communication subsystem, a BLUETOOTH® communication subsystem, a Near Field Communication (NFC) subsystem, etc.) and/or any other communication components that would be apparent to one of skill in the art in possession of the present disclosure. While a specific secondary locking key access device 400 has been illustrated and described, one of skill in the art in possession of the present disclosure will recognize that the secondary connection devices described herein may include a variety of components and/or component configurations for providing the functionality discussed below while remaining within the scope of the present disclosure.

Figure 5A:
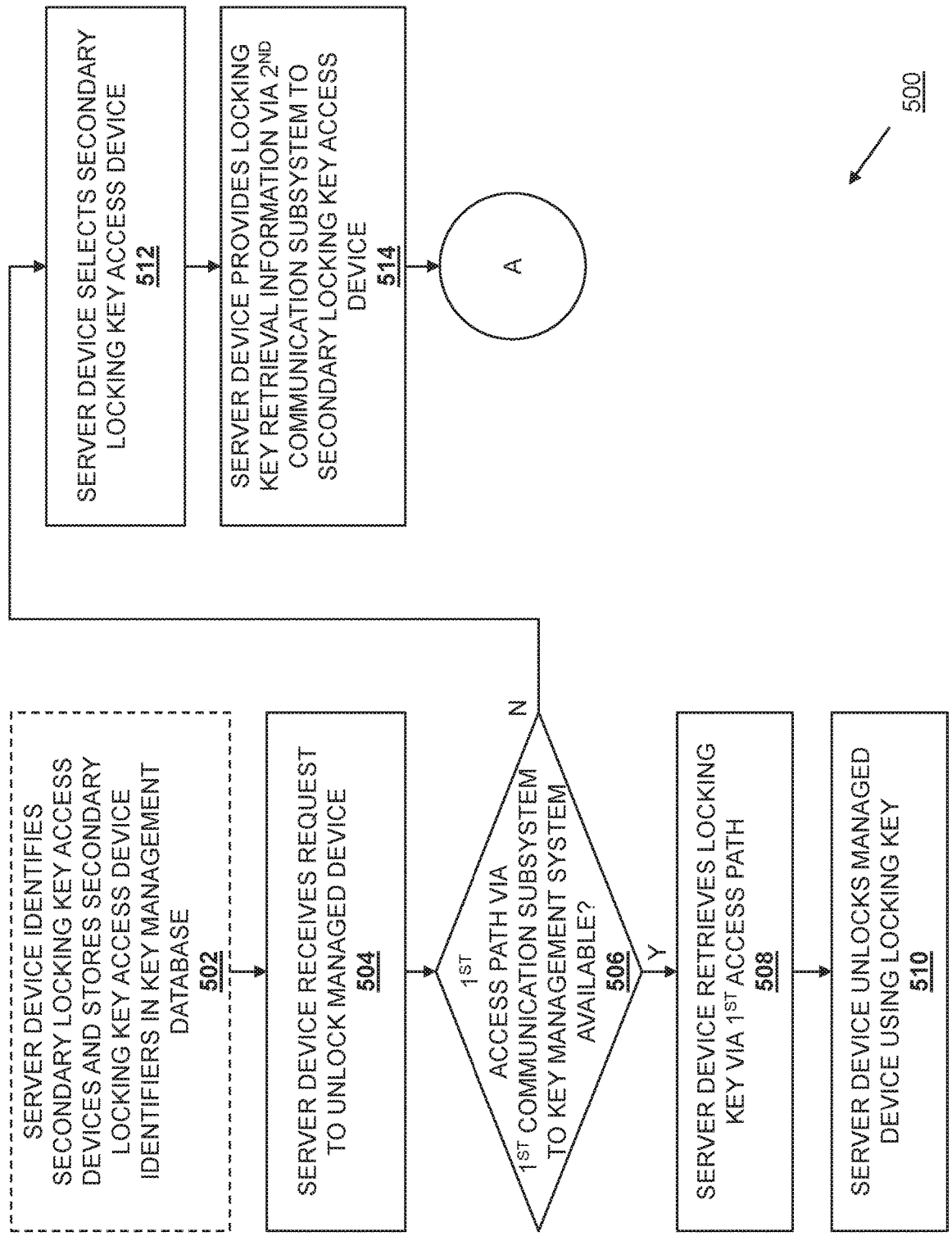
FIG. 5A is a flow chart illustrating an embodiment of a portion of a method for providing secondary access to locking keys.
Figure 5B:
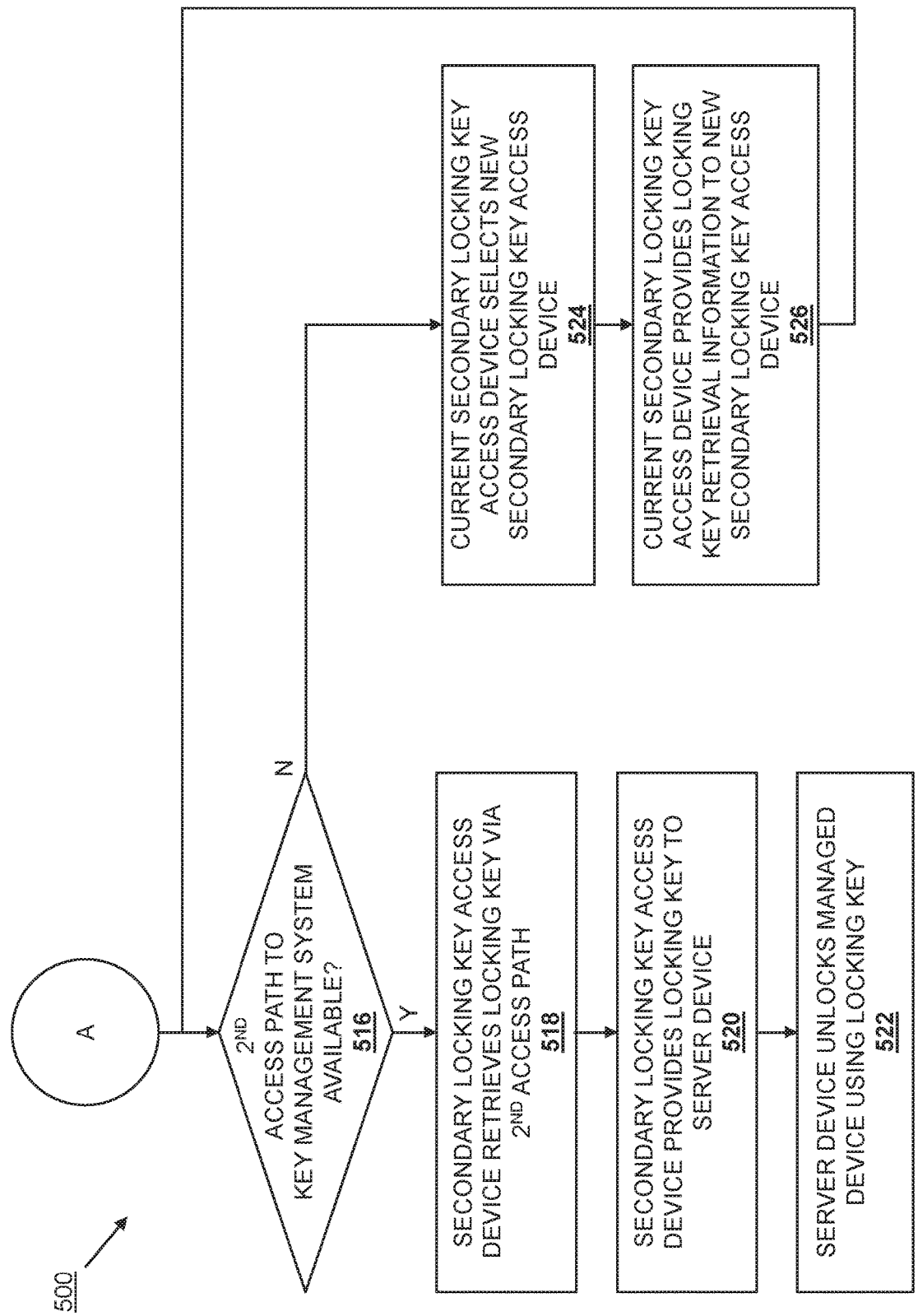
FIG. 5B is a flow chart illustrating an embodiment of a portion of a method for providing secondary access to locking keys.

Referring now to FIG. 5, an embodiment of a method 500 for providing secondary access to locking keys is illustrated. As discussed below, the systems and methods of the present disclosure provide a second access path for retrieving locking keys used to unlock managed devices when a first access path for retrieving those locking keys is unavailable. For example, a first server device may include a first remote access controller device that utilizes a first communication subsystem to communicate via a first switch device in order to retrieve locking keys from a key management system via a first access path. In the event the first remote access controller device receives a request to unlock a managed device and determines that the first access path to the key management system is unavailable (e.g., the first switch device is unavailable, the first communication subsystem is unavailable, etc.), the first remote access controller device operates to select a secondary locking key access device through which to retrieve the locking key. In some examples, the secondary locking key access device may be provided by a second server device that includes a second remote access controller device that is configured to access the key management system using a second access path (e.g., provided by a second switch device). In other examples, the secondary locking key access device may be provided by a wireless networking device (e.g., a router, an access point, etc.) or a computing device (e.g., a desktop or laptop/notebook computing device) that is configured to access the key management system using a second access path.

The first remote access controller device may then use a second communication subsystem to provide locking key request information to the secondary locking key access device, and the secondary locking key access device may determine whether the second access path to the key management system is available. If the second access path is available, the secondary locking key access device may use the locking key request information to retrieve the locking key from the key management system, and provide that locking key to the first remote access controller. If the second access path is unavailable, the secondary locking key access device (a "current" secondary locking key access device) may operate to select another secondary locking key access device (a "new" secondary locking key access device) through which to retrieve the locking key in substantially the same manner described above, and the selection of new secondary locking key access devices by current secondary locking key access devices continuing until a secondary locking key access device is found that has an available access path to the key management system for retrieving the locking key and providing it to the first remote access controller device. The first remote access controller device will then authenticate the locking key received from the secondary locking key access device, and use the authenticated locking key to unlock its managed device. As such, managed devices may be unlocked in the event primary access paths to the key management system are unavailable for retrieving their locking keys, resulting in increased server device availability/uptime.

The method 500 may begin at optional block 502 where a server device may identify secondary locking key access device(s) and store secondary locking device access identifier(s) for those in a key management database. In an embodiment, at optional block 502, the remote access controller device 306 in the server device 300 may identify secondary locking key access device(s) and store identifier(s) for those secondary locking key access device(s) in its key management database 310. In a specific example, the secondary locking key access subsystem 308d provided by the remote access controller engine 308 in the remote access controller device 306 in the server device 300 may use the second communication subsystem 314 to discover secondary locking key access device(s). In some of the examples discussed below, the second communication subsystem 314 may be wireless communication subsystem, and at block 502 the secondary locking key access subsystem 308d may utilize the second communication subsystem 314 to wirelessly communicate with any devices within range of the second communication subsystem 314 in order to determine whether those devices are configured to operate as the secondary locking key access devices of the present disclosure. As such, with reference to FIG. 2, at optional block 502 the server device 206a may operate to discover that the server device 206b, the server device 206c, and the secondary locking key access device(s) 208 are all configured to operate as the secondary locking key access devices.

In a specific example, the server device 206a may be coupled to the key management system 202 via a first switch device in the network 204 that provides a first access path to the key management system 202, the server device 206b may be coupled to the key management system 202 via a second switch device in the network 204 that is different than the first switch device and that provides a second access path to the key management system 202 that is different than the first access path, and the server device 206c may be coupled to the key management system 202 via a third switch device in the network 204 that is different than the first switch device and the second switch device, and that provides a third access path to the key management system 202 that is different than the first access path and the second access path. At optional block 502, a first remote access controller device in the server device 206a may use a second communication subsystem in the server device 206a to communicate with a second remote access controller device in the server device 206b and a third remote access controller device in the server device 206c, and determine that each of the server devices 206b and 206c are configured to operate the secondary locking key access devices of the present disclosure. In addition, the first remote access controller device in the server device 206a may use the second communication subsystem in the server device 206a to communicate with the secondary locking key access device(s) 208 (which as discussed above may be provided by computing devices, networking devices, etc.), and determine that those secondary locking key access device(s) 208 are configured to operate the secondary locking key access devices of the present disclosure. While not described herein in detail, the discovery of the secondary locking key access devices at optional block 502 may be performed using a variety of discovery protocols and/or discovery techniques that would be apparent to one of skill in the art in possession of the present disclosure.

In response to identifying the secondary locking key access devices, at optional block 502 the secondary locking key access subsystem 308d provided by the remote access controller engine 308 in the remote access controller device 306 in the server device 300 may operate to store, in the key management database 310, associated secondary locking key access device identifiers for each of the secondary locking key access devices that were identified. As such, continuing with the example provided above, at optional block 502 the first remote access controller device in the server device 206a may store a server device identifier for the server device 206b in the key management database included in the first remote access controller device, a server device identifier for the server device 206c in the key management database included in the first remote access controller device, and a secondary locking key access device identifier for the secondary locking key access device 208 in the key management database included in the first remote access controller device. However, while the discovery of secondary locking key access devices at optional block 502 has been described, one of skill in the art in possession of the present disclosure will recognize that optional block 502 may be skipped, and secondary locking key access devices may be identified when needed during the method 500 while remaining within the scope of the present disclosure.

The method 500 may proceed to (or begin at) block 504 where the server device receives a request to unlock a managed device. In an embodiment, at block 504, the remote access controller engine 308 provided by the remote access controller device 306 in the server device 300 may receive a request to unlock a managed device 304. For example, at block 504, the server device 300 may boot, reset, and/or otherwise be initialized and, in response, a request may be received by the remote access controller device 306 (e.g., from a Basic Input/Output System (BIOS) in the server device 300) to unlock a managed device 304 provided by a storage device (e.g., that may include server device initialization data such as boot data). However, while the unlocking of a managed device provided by a storage device in response to server device initialization is described herein, one of skill in the art in possession of the present disclosure will recognize that managed devices may be provided by a variety of devices other than storage devices, and/or may be unlocked at times other than server device initialization, while remaining within the scope of the present disclosure.

The method 500 then proceeds to decision block 506 where the server device determines whether a first access path via a first communication subsystem to a key management server is available. In an embodiment, at decision block 506, the request to unlock the managed device 304 that is received by the remote access controller engine 308 at block 504 may be provided to the key management client 308a. In response to receiving the request to unlock the managed device 304, the key management client 308a may retrieve managed device information from the key management database 310 and provide that managed device information to the security subsystem 308b, with the security subsystem 308b utilizing the managed device information to generate locking key retrieval information that is configured to provide for the retrieval of a locking key for the managed device 304 from the key management system 202. For example, as would be understood by one of skill in the art in possession of the present disclosure, the locking of managed devices may include the retrieval of managed device information about those managed devices, and the use of that managed device information to generate a locking key (e.g., by the key management client 308a, or by the key management system 202, depending on the key management scheme being used) for use in locking that managed device. As such, in order to retrieve that locking key from the key management system 202 subsequent to locking the managed device 304, the managed device information used to generate the locking key that locked the managed device 304 is stored in the key management database 310, and may be retrieved from the key management database 310 and provided to the security subsystem 308b for use in generating the locking key retrieval information that may identify the locking key/managed device 304, and may include certificates and/or other authentication information to authenticate to the key management system 202 for retrieving that locking key. However, while a specific locking key retrieval procedure has been described, one of skill in the art in possession of the present disclosure will recognize that other locking key retrieval procedures will fall within the scope of the present disclosure as well.

As such, at decision block 506, the key management client 308a may receive the locking key retrieval information from the security subsystem 308b, and use the first communication subsystem 312 to attempt to provide that locking key retrieval information through the network 204 to the key management system 202 along a first access path. In embodiments in which the first access path is available, the locking key retrieval information is provided via the first access path to the key management system 202, and the key management system 202 may utilize the locking key retrieval information to authenticate the key management client 308a for receiving the locking key for the managed device 304, retrieve the locking key, and provide the locking key through the network 204 to the server device 300. As such, at decision block 506, the key management client 308a may determine that the first access path is available in response to receiving an indication from the key management system 202 that the key management client 308a was not authenticated for receiving the locking key for the managed device 304, in the response to receiving the locking key for the managed device 304, and/or in response to receiving other communications from the key management system 202 that would be apparent to one of skill in the art in possession of the present disclosure.

However, in other embodiments, the second access path may not be available. For example, the first communication subsystem 312 in the remote access controller device 306 may be down or otherwise unavailable, preventing the key management client 308a from sending the locking key retrieval information through the network to the key management system 202. In another example, a first switch device that couples the server device 206a/300 to the key management system 202 may be down or otherwise unavailable, preventing the locking key retrieval information sent by the key management client 308a through the first communication subsystem 312 from reaching the key management system 202. While a few examples have been described, one of skill in the art in possession of the present disclosure will recognize that there may be a variety of reasons that the first access path for the server device 300 to the key management server 200 is unavailable, and any of those reasons for first access path unavailability will fall within the scope of the present disclosure as well. As such, at decision block 506, the key management client 308a may determine that the first access path is unavailable in response to the failure to receive the locking key for the managed device 304 during some time period.

If, at decision block 506, the server device determines that the first access path via the first communication subsystem to the key management server is available, the method 500 proceeds to block 508 where the server device retrieves a locking key via the first access path. As discussed above, if the first access path from the server device 300 to the key management system 202 is available, the key management client 308a may receive the locking key for the managed device 304 at block 508, The method 500 may then proceed to block 510 where the server device unlocks the managed device using the locking key. In an embodiment, at block 510, the key management client 308a provided by the remote access controller engine 308 in the remote access controller device 306 in the server device 300 may provide that locking key to the lock/unlock subsystem 308c, which may operate to use that locking key to unlock the managed device 304 for which the request to unlock was received at block 504. While not described herein in detail, one of skill in the art in possession of the present disclosure will recognize how a key management client (e.g., a KMIP client) and a lock/unlock subsystem (e.g., an RTCEM) may utilize a locking key retrieved from a key management system (e.g., a KMIP server) in order to unlock a managed device. As such, following block 510, the managed device may be unlocked and utilized by the server device. For example, the managed device may be provided by a storage device as discussed above, and initialization/boot data stored on that storage device may be utilized by a BIOS in the server device 300 in order to perform boot operations such that the server device 300 is available for use.

If, at decision block 506, the server device determines that the first access path via the first communication subsystem to the key management server is unavailable, the method 500 proceeds to block 512 where the server device selects a secondary locking key access device. As discussed above, if the first access path from the server device 300 to the key management system 202 is unavailable, the key management client 308a will not receive the locking key for the managed device 304 during some time period. As such, at block 512, the remote access controller engine 308 provided by the remote access controller device 306 in the server device 300 may select a secondary locking key access device. For example, in response to not receiving the locking key for the managed device 304 during the time period, the key management client 308a may generate an error that causes the secondary locking key access subsystem 308d to be activated. In a specific example, the secondary locking key access subsystem 308d may be provided by a daemon that has a callback registered with the key management client 308a, and thus the error generation by the key management client 308a may provide for the activation/invoking of the secondary locking key access subsystem 308d. In some embodiments, upon activation, the secondary locking key access subsystem 308a may attempt to restart the first communication subsystem 312 and, subsequent to that restart operation, determine whether the first access path has become available. In the event a restart operation of the first communication subsystem 312 causes the first access path to become available, the secondary locking key access subsystem 308d may return control to the key management client 308a so that the key management client 308a may use the first access path to retrieve the locking key for the managed device 304 as discussed above.

However, in the event the restart operation of the first communication subsystem 312 does not result in the availability of the first access path, the secondary locking key access subsystem 308d (and/or the key management client 308a) may operate to select a secondary locking key access device. In embodiments of the method 500 in which optional block 502 is performed and secondary locking key access device identifiers are stored in the key management database 310, the secondary locking key access subsystem 308d (and/or the key management client 308a) may access the key management database 310 and use the secondary locking key access device identifiers stored therein to select a secondary locking key access device. However, in embodiments of the method 500 in which optional block 502 is not performed, the secondary locking key access subsystem 308d may identify secondary locking key access device(s) in substantially the same manner as discussed above with regard to optional block 502. Furthermore, in some examples, the secondary locking key access subsystem 308d (and/or the key management client 308a) may provide a second access path request to secondary locking key access device identified by secondary locking key access device identifiers in the key management database 310, and select a secondary locking key access device from one or more responses that are received following the sending of that request (e.g., by secondary locking key access devices that have an available second access path). As such, the determination that the first access path between the server device 300 and the key management system 202 is unavailable may result in the server device identifying and selecting a secondary locking key access device to provide a second access path to the key management system 202.

Figure 6:
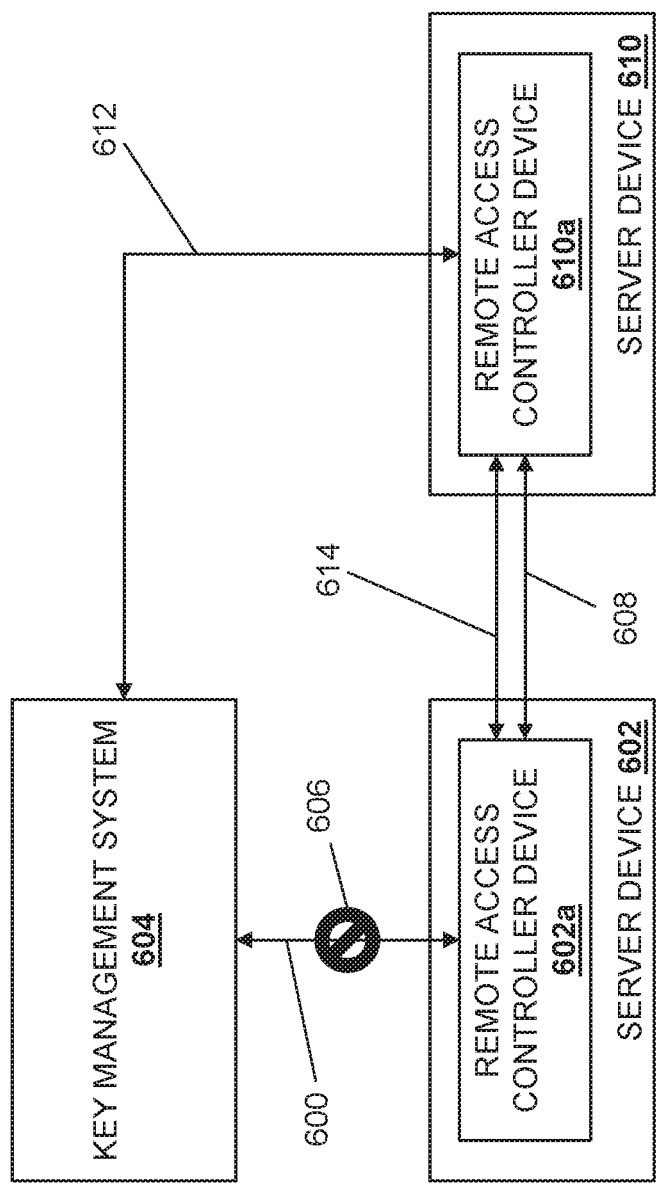
FIG. 6 is a schematic view illustrating an embodiment of a first server device utilizing a secondary access path via a second server device to retrieve locking keys.

The method 500 then proceeds to block 514 where the server device provides locking key retrieval information via a second communication subsystem to the secondary locking key access device. In an embodiment, at block 514, the secondary locking key access subsystem 308d provided by the remote access controller engine 308 in the remote access controller device 306 in the server device 300 may operate to recrieve the locking key retrieval information (e.g., from the key management client 308a, from the security subsystem 308b, etc.), and use the second communication subsystem 314 to transmit the locking key retrieval information along with a request to retrieve the locking key for the managed device 304 to the secondary locking key access device selected at block 512. With reference to FIG. 6, a first access path 600 provided between a server device 602 (e.g., the server device 206a of FIG. 2) and key management system 604 (e.g., the key management system 202 of FIG. 2) is illustrated as being unavailable (as indicated by element 606), and a remote access controller device 602a in the server device 602 is illustrated as transmitting a locking key retrieval information/locking key request 608 to a remote access controller device 610a in a server device 610 (e.g., the server device 206b of FIG. 2) at block 514.

Figure 7:
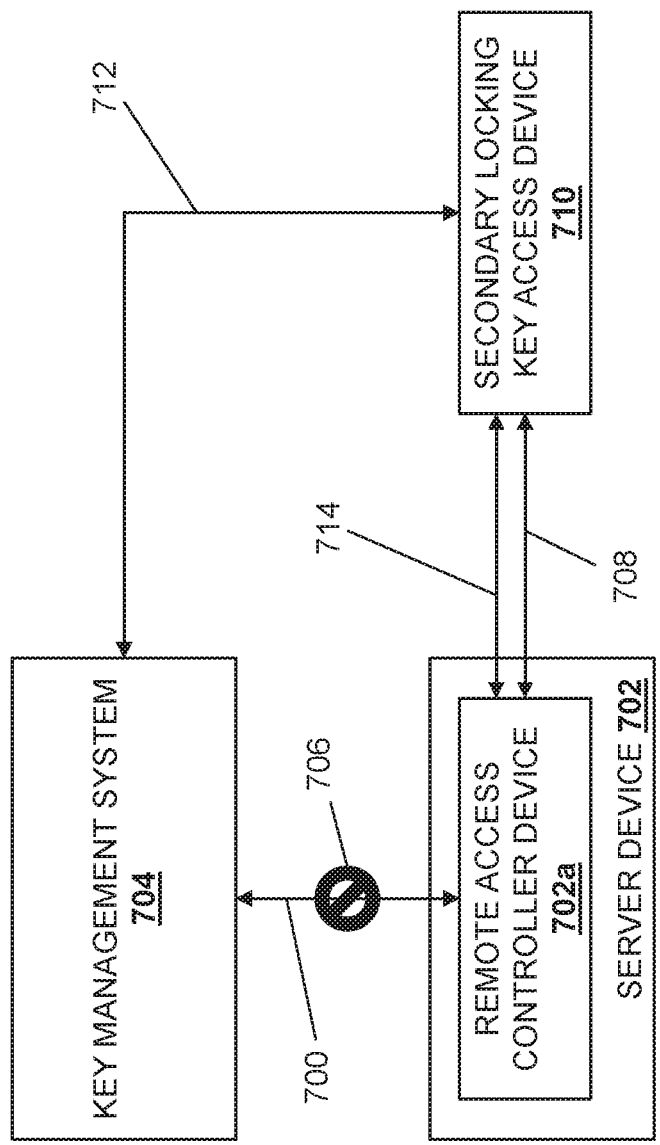
FIG. 7 is a schematic view illustrating an embodiment of a first server device utilizing a secondary access path via a secondary locking key access device to retrieve locking keys.
Figure 8:
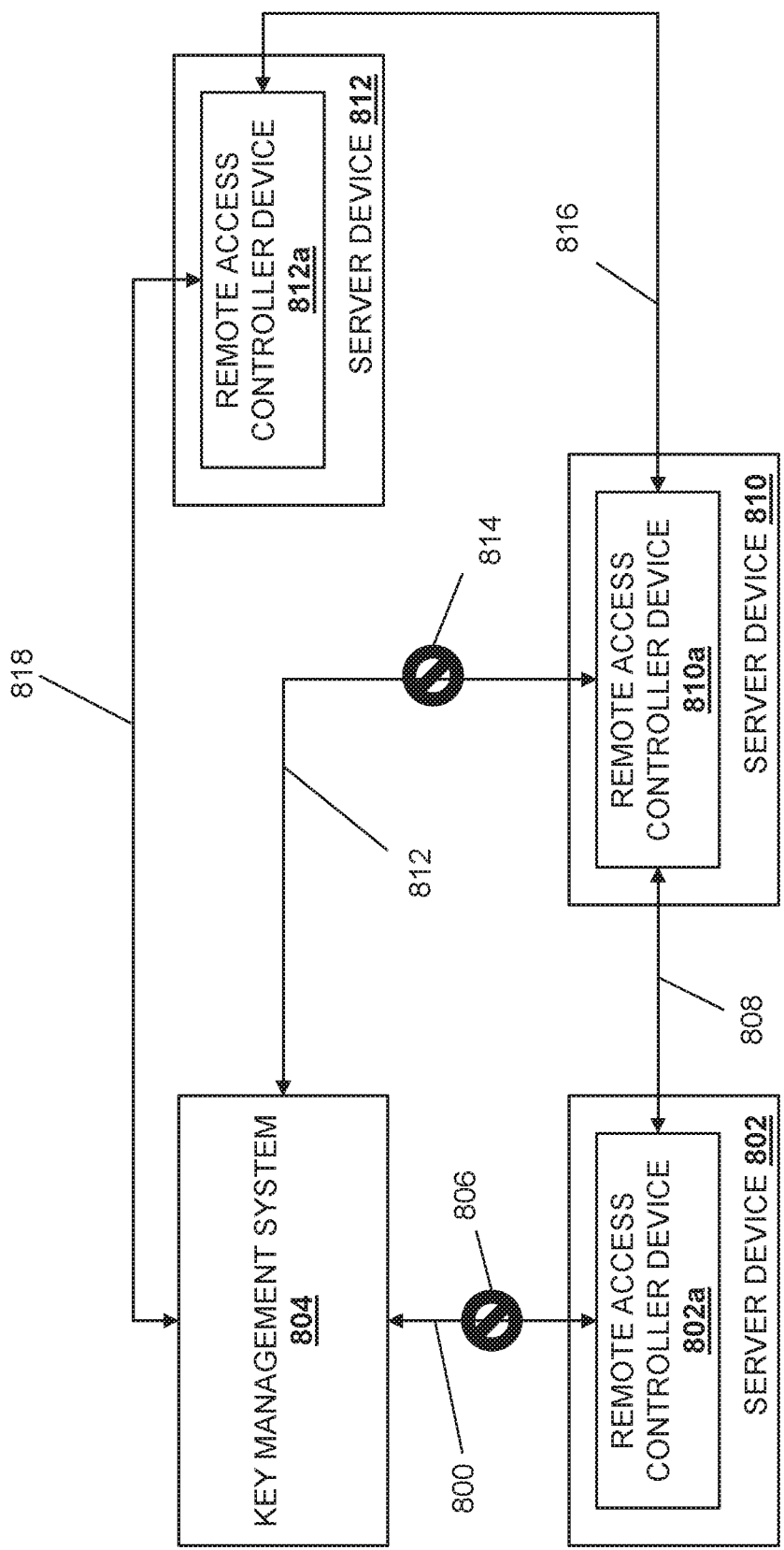
FIG. 8 is a schematic view illustrating an embodiment of a first server device utilizing a tertiary access path via a second server device and a third server device to retrieve locking keys.
Figure 9:
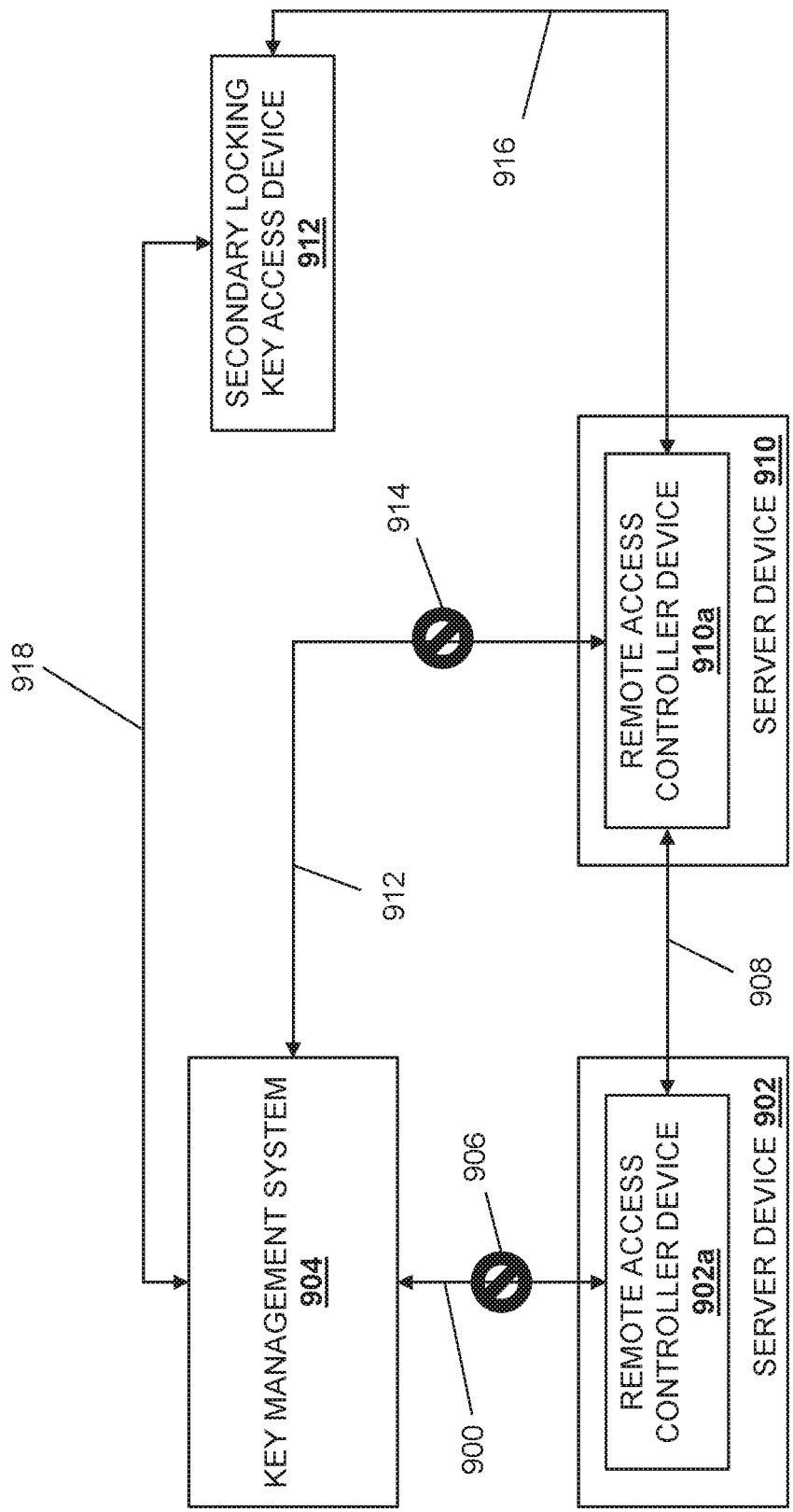
FIG. 9 is a schematic view illustrating an embodiment of a first server device utilizing a tertiary access path via a second server device and a secondary locking key access device to retrieve locking keys.

With reference to FIG. 7, a first access path 700 provided between a server device 702 (e.g., the server device 206a of FIG. 2) and key management system 704 (e.g., the key management system 202 of FIG. 2) is illustrated as being unavailable (as indicated by element 706), and a remote access controller device 702a in the server device 702 is illustrated as transmitting a locking key retrieval information/locking key request 708 to a secondary locking key access device 710 (e.g., one of the secondary locking key access devices 208 of FIG. 2) at block 514. With reference to FIG. 8, a first access path 800 provided between a server device 802 (e.g., the server device 206a of FIG. 2) and key management system 804 (e.g., the key management system 202 of FIG. 2) is illustrated as being unavailable (as indicated by element 806), and a remote access controller device 802a in the server device 802 is illustrated as transmitting a locking key retrieval information/locking key request 808 to a remote access controller device 810a in a server device 810 (e.g., the server device 206b of FIG. 2) at block 514. With reference to FIG. 9, a first access path 900 provided between a server device 902 (e.g., the server device 206a of FIG. 2) and key management system 904 (e.g., the key management system 202 of FIG. 2) is illustrated as being unavailable (as indicated by element 906), and a remote access controller device 902a in the server device 902 is illustrated as transmitting a locking key retrieval information/locking key request 908 to a remote access controller device 910a in a server device 910 (e.g., the server device 206b of FIG. 2) at block 514.

Figure 10:
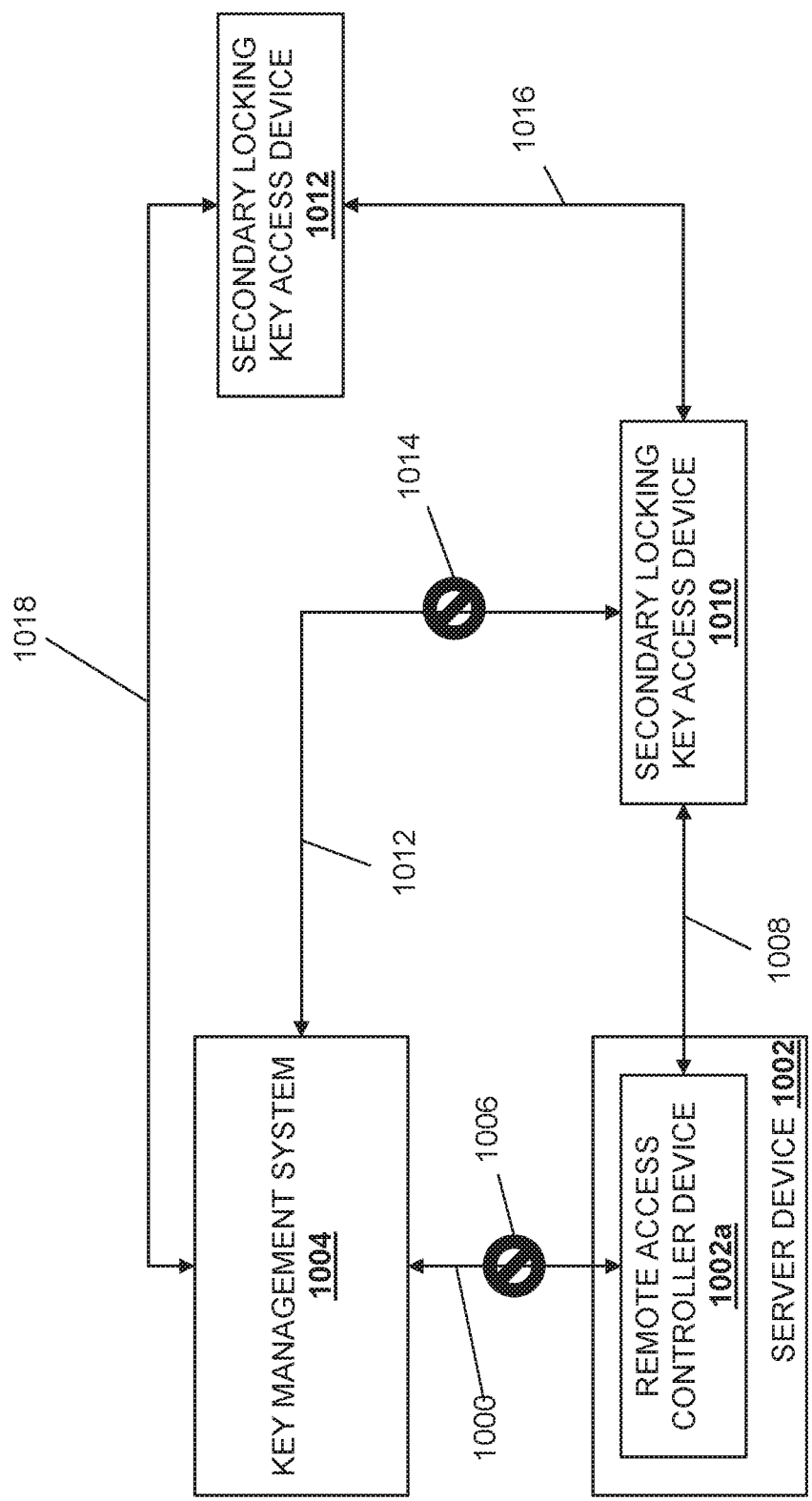
FIG. 10 is a schematic view illustrating an embodiment of a first server device utilizing a tertiary access path via a first secondary locking key access device and a second secondary locking key access device to retrieve locking keys.
Figure 11:
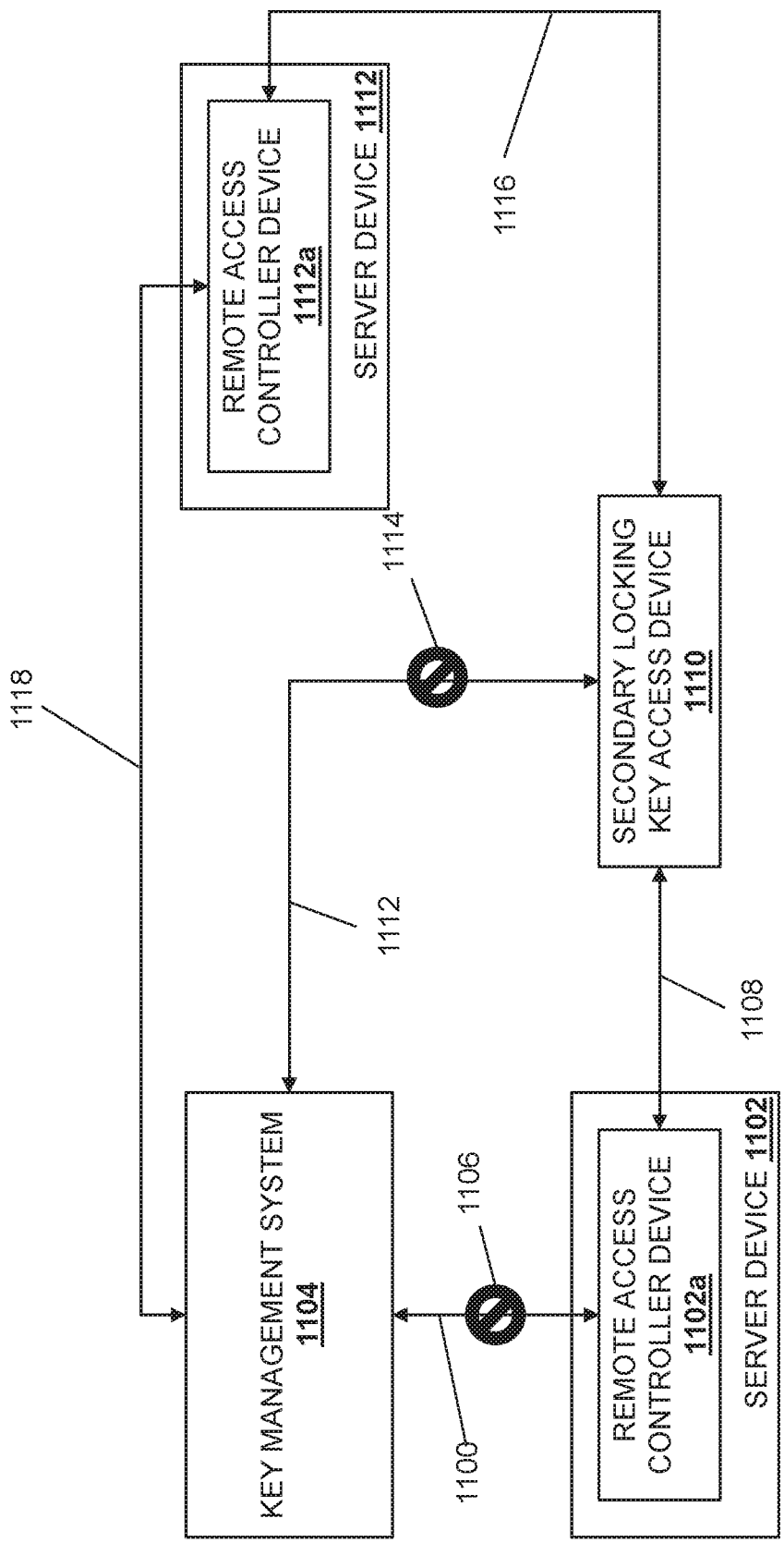
FIG. 11 is a schematic view illustrating an embodiment of a first server device utilizing a tertiary access path via a secondary locking key access device and a second server device to retrieve locking keys.

With reference to FIG. 10, a first access path 1000 provided between a server device 1002 (e.g., the server device 206a of FIG. 2) and key management system 1004 (e.g., the key management system 202 of FIG. 2) is illustrated as being unavailable (as indicated by element 1006), and a remote access controller device 1002a in the server device 1002 is illustrated as transmitting a locking key retrieval information/locking key request 1008 to a secondary locking key access device 1010 (e.g., one of the secondary locking key access devices 208 of FIG. 2) at block 514. With reference to FIG. 11, a first access path 1100 provided between a server device 1102 (e.g., the server device 206a of FIG. 2) and key management system 1104 (e.g., the key management system 202 of FIG. 2) is illustrated as being unavailable (as indicated by element 1106), and a remote access controller device 1102a in the server device 1102 is illustrated as transmitting a locking key retrieval information/locking key request 1108 to a secondary locking key access device 1110 (e.g., one of the secondary locking key access devices 208 of FIG. 2) at block 514.

Thus, in embodiments where the secondary locking key access device is selected by a first server device 206a/300 at block 512 and is provided by a second server device 206b/300, at block 514 the secondary locking key access subsystem 308d in the second server device 206b/300 may receive (via the second communication subsystem 314 in the second server device 206b/300) the locking key retrieval information/locking key request transmitted by the first server device 206a/300, and may provide that locking key retrieval information/locking key request to the key management client 308a in the second server device 206b/300. Furthermore, in in embodiments where the secondary locking key access device is selected by the server device 300 at block 512 and is provided by the secondary locking key access device 400, at block 514 the secondary locking key access engine 404 in the secondary locking key access device 400 may receive (via the second communication subsystem 408 in the secondary locking key access device 400) the locking key retrieval information/locking key request transmitted by the server device 300.

The method 500 then proceeds to decision block 516 where the secondary locking key access device determines whether a second access path to the key management server is available. In an embodiment, at decision block 516, the secondary locking key access device that received the locking key retrieval information at block 514 operates to determine whether a second access path to the key management system 202 is available. In examples in which the secondary locking key access device is provided by the server device 300, the key management client 308*a* may use the first communication subsystem 312 to attempt to provide that locking key retrieval information through the network 204 to the key management system 202 along a second access path. In embodiments in which the second access path is available, the locking key retrieval information is provided via the second access path to the key management system 202, and the key management system 202 may utilize the locking key retrieval information to authenticate the key management client 308*a* for receiving the locking key for the managed device 304, retrieve the locking key, and provide the locking key through the network 204 to the server device 300. As such, at decision block 516, the key management client 308*a* may determine that the second access path is available in response to receiving an indication from the key management system 202 that the key management client 308*a* was not authenticated for receiving the locking key for the managed device 304, in the response to receiving the locking key for the managed device 304, and/or in response to receiving other communications from the key management system 202 that would be apparent to one of skill in the art in possession of the present disclosure.

However, in other embodiments, the second access path may not be available. For example, the first communication subsystem 312 in the remote access controller device 306 may be down or otherwise unavailable, preventing the key management client 308*a* from sending the locking key retrieval information through the network to the key management system 202. In another example, a second switch device that couples the server device 206*b*/300 to the key management system 202 may be down or otherwise unavailable, preventing the locking key retrieval information sent by the key management client 308*a* through the first communication subsystem 312 from reaching the key management system 202. While a few examples have been described, one of skill in the art in possession of the present disclosure will recognize that there may be a variety of reasons that the second access path for the server device 300 to the key management server 200 is unavailable, and any of those reasons for second access path unavailability will fall within the scope of the present disclosure as well. As such, at decision block 516, the key management client 308*a* may determine that the second access path is unavailable in response to the failure to receive the locking key for the managed device 304 during some time period.

In examples in which the secondary locking key access device is provided by the secondary locking key access device 400, the secondary locking key access engine 404 may use the communication subsystem 408 to attempt to provide that locking key retrieval information through the network 204 to the key management system 202 along a second access path. In embodiments in which the second access path is available, the locking key retrieval information is provided via the second access path to the key management system 202, and the key management system 202 may utilize the locking key retrieval information to authenticate the secondary locking key access engine 404 for receiving the locking key for the managed device 304, retrieve the locking key, and provide the locking key through the network 204 to the secondary locking key access device 400. As such, at decision block 516, the secondary locking key access engine 404 may determine that the second access path is available in response to receiving an indication from the key management system 202 that the secondary locking key access engine 404 was not authenticated for receiving the locking key for the managed device 304, in the response to receiving the locking key for the managed device 304, and/or in response to receiving other communications from the key management system 202 that would be apparent to one of skill in the art in possession of the present disclosure.

However, in other embodiments, the second access path may not be available. For example, a switch device that couples the secondary locking key access device 208/400 to the key management system 202 may be down or otherwise unavailable, preventing the locking key retrieval information sent by the secondary locking key access engine 404 through the communication subsystem 408 from reaching the key management system 202. While a few examples have been described, one of skill in the art in possession of the present disclosure will recognize that there may be a variety of reasons that the second access path for the secondary locking key access device 208/400 to the key management server 200 is unavailable, and any of those reasons for second access path unavailability will fall within the scope of the present disclosure as well. As such, at decision block 516, the secondary locking key access engine 404 may determine that the second access path is unavailable in response to the failure to receive the locking key for the managed device 304 during some time period.

If, at decision block 516, the secondary locking key access device determines that the second access path to the key management server is available, the method 500 proceeds to block 520 where the secondary locking key access device retrieves a locking key via the second access path. As discussed above, if the second access path from the secondary locking key access device to the key management system 202 is available, the secondary locking key access device may retrieve the locking key for the managed device 304, and at block 520 the secondary locking key access device will provide that locking key to the server device. For example, the secondary locking key access subsystem 308*d* provided by the remote access controller engine 308 in the remote access controller device 306 in the server device 300 may receive the locking key at block 520, and in some embodiments may provide that locking key to the key management client 308*a* for authentication. While not described herein in detail, one of skill in the art in possession of the present disclosure will recognize that the key management client 308*a* (e.g., a KMIP client) may perform a variety of authentication operations on the locking key received at block 520 in order to ensure the authenticity of that locking key.

The method 500 may then proceed to block 522 where the server device unlocks the managed device using the locking key in substantially the same manner as discussed above with regard to block 510. With reference to FIG. 6, the remote access controller device 610*a* in the server device 610 is illustrated as utilizing a second access path 612 to retrieve the locking key from the key management system 604, and provide a communication 614 that includes that locking key to the remote access controller device 602*a* in the server device 602 for use in unlocking its managed device, With reference to FIG. 7, the secondary locking key access device 710 is illustrated as utilizing a second access path 712 to retrieve the locking key from the key management system 704, and provide a communication 714 that includes that locking key to the remote access controller device 702*a* in the server device 702 for use in unlocking its managed device. In a specific example, the second access path 712 in FIG. 7 may be enabled via a wireless connection (e.g., a WiFI direct connection, a BLUETOOTH® connection, an NFC connection) between a wireless communication subsystem in the key management system 704 and a wireless communication subsystem in the secondary locking key access device 710.)

If, at decision block 516, the server device determines that the second access path to the key management server is unavailable, the method 500 proceeds to block 524 where a current secondary locking key access device selects a new secondary locking key access device. As discussed above, if the second access path from the secondary locking key access device to the key management system 202 is unavailable, the secondary locking key access device will not receive the locking key for the managed device 304 during some time period. As such, at block 524, the secondary locking key access device (referred to as a "current secondary locking key device" in this example) may select another secondary locking key access device (referred to as a "new secondary locking key access device" in this example).

In examples in which the current secondary locking key access device is provided by the server device 300, in response to not receiving the locking key for the managed device 304 during the time period, the key management client 308*a* may select the new secondary locking key access device in substantially the same manner as discussed above with reference to block 512. In examples in which the current secondary locking key access device is provided by the secondary locking key access device 400, in response to not receiving the locking key for the managed device 304 during the time period, the secondary locking key access engine 404 may select the new secondary locking key access device in substantially the same manner as discussed above as described with reference to block 512. As such, the determination that the second access path between the secondary locking key access device and the key management system 202 is unavailable may result in the current secondary locking key access device identifying and selecting a new secondary locking key access device to provide a third access path to the key management system 202.

The method 500 then proceeds to block 526 where the current secondary locking key access device provides the locking key retrieval information to the new secondary locking key access device. In an embodiment, at block 526, the current secondary locking key access device provides the locking key retrieval information (received from the server device at block 514) to the new secondary locking key access device, and the method 500 then returns to decision block 516 where the new secondary locking key access device performs the subsequent blocks of the method 500 acting as the secondary locking key access device and/or the current secondary locking key access device discussed above. With reference to FIG. 8, a second access path 812 provided between the server device 810 (e.g., the server device 206*b* of FIG. 2) and key management system 804 (e.g., the key management system 202 of FIG. 2) is illustrated as being unavailable (as indicated by element 814), and the remote access controller device 810*a* in the server device 810 is illustrated as transmitting a locking key retrieval information/locking key request 816 to a remote access controller device 812*a* in a server device 812 (e.g., the server device 206*c* of FIG. 2) at block 526. The remote access controller device 812*a* in the server device 812*a* is illustrated as utilizing a third access path 818 to retrieve the locking key from the key management system 804, and may provide a communication that includes that locking key to the remote access controller device 810*a* in the server device 810, which may provide a communication that includes that locking key to the remote access controller device 802*a* in the server device 802 for use in unlocking its managed device.

With reference to FIG. 9, a second access path 912 provided between the server device 910 (e.g., the server device 206*b* of FIG. 2) and key management system 904 (e.g., the key management system 202 of FIG. 2) is illustrated as being unavailable (as indicated by element 914), and the remote access controller device 910*a* in the server device 910 is illustrated as transmitting a locking key retrieval information/locking key request 916 to a secondary locking key access device 912 (e.g., one of the secondary locking key access device(s) 208 of FIG. 2) at block 526. The secondary locking key access device 912 is illustrated as utilizing a third access path 918 to retrieve the locking key from the key management system 904, and may provide a communication that includes that locking key to the remote access controller device 910*a* in the server device 910, which may provide a communication that includes that locking key to the remote access controller device 902*a* in the server device 902 for use in unlocking its managed device.

With reference to FIG. 10, a second access path 1012 provided between the server device 1010 (e.g., the server device 206*b* of FIG. 2) and key management system 1004 (e.g., the key management system 202 of FIG. 2) is illustrated as being unavailable (as indicated by element 1014), and the secondary locking key access device 1010 is illustrated as transmitting a locking key retrieval information/locking key request 1016 to a secondary locking key access device 1012 (e.g., one of the secondary locking key access device(s) 208 of FIG. 2) at block 526. The secondary locking key access device 1012 is illustrated as utilizing a third access path 1018 to retrieve the locking key from the key management system 1004, and may provide a communication that includes that locking key to the secondary locking key access device 1010, which may provide a communication that includes that locking key to the remote access controller device 1002*a* in the server device 1002 for use in unlocking its managed device.

With reference to FIG. 11, a second access path 1112 provided between the secondary locking key access device 1110 (e.g., one of the secondary locking key access device(s) 208 of FIG. 2) and key management system 1104 (e.g., the key management system 202 of FIG. 2) is illustrated as being unavailable (as indicated by element 1114), and the secondary locking key access device 1110 is illustrated as transmitting a locking key retrieval information/locking key request 1116 to a remote access controller device 1112*a* in a server device 112 (e.g., the server device 206*c* of FIG. 2) at block 526. The remote access controller device 1112*a* is illustrated as utilizing a third access path 1118 to retrieve the locking key from the key management system 1104, and may provide a communication that includes that locking key to the secondary locking key access device 1110, which may provide a communication that includes that locking key to the remote access controller device 1102*a* in the server device 1102 for use in unlocking its managed device.

While FIGS. 8-11 illustrate the use of a third access path to the key management system in response to the unavailability of a second access path to the key management system, one of skill in the art in possession of the present disclosure will recognize that any number of access paths to the key management system may be checked for their availability until one is found for use in retrieving the locking key for a managed device, as the method 500 may loop through decision block 516 and blocks 524 and 526 until a new secondary locking key access device is found that has an available path to the key management system that allows the locking key to be retrieved, or it is determined that there are no available paths to the key management system. In embodiments in which it is determined that there are no available paths to the key management system via the secondary locking key access devices in communication with the server device 206a/300, the server device 206a/300 may send a request to a network administrator to add a secondary locking key access device to the datacenter for which to use in retrieving the locking key for its managed device (which may be selected and used to retrieve the locking key in substantially the same manner as described above.)

Thus, systems and methods have been described that provide a second access path for retrieving a locking key for a managed device when a first access path for retrieving that locking key is unavailable. A first remote access controller device in a first server device attempts to retrieve locking keys from a key management system via a first access path, and determines that the first access path is unavailable. The first remote access controller device then selects a secondary locking key access device through which to retrieve the locking key, and uses a second communication subsystem to provide locking key request information to the secondary locking key access device. The secondary locking key access device determines whether the second access path to the key management system is available and, if so, uses the locking key request information to retrieve the locking key from the key management system, and provides that locking key to the first remote access controller. In the event the second access path is unavailable, the secondary locking key access device selects another secondary locking key access device through which to retrieve the locking key from the key management system, and the selection of new secondary locking key access devices continues until a secondary locking key access device is found that has an available access path to the key management system for retrieving the locking key and providing it to the first remote access controller device. The first remote access controller device will authenticate the locking key received from the secondary locking key access device, and use the authenticated locking key to unlock its managed device. As such, managed devices may be unlocked in the event primary access paths to the key management system are unavailable for retrieving their locking keys, resulting in increased server device availability/uptime.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A locking key secondary access system, comprising:
   a key management system;
   a secondary locking key access device that is coupled to the key management system via a network;
   a tertiary locking key access device that is coupled to the key management system via a network; and
   a first server device that is coupled to the key management system via the network, wherein the first server device includes:
   a managed device; and
   a first remote access controller device that is coupled to the managed device and that is configured to:
     receive a request to unlock the managed device;
     determine that a first access path that is provided via a first communication subsystem and through the network to the key management system is unavailable;
     provide, in response to determining that the first access path is unavailable, locking key request information via a second communication subsystem to the secondary locking key access device, wherein the locking key request information is configured to provide for retrieval of a locking key for the managed device from the key management system;
     receive, from the secondary locking key access device via the second communication subsystem, the locking key; and
     unlock the managed device using the locking key,
   wherein the secondary locking key access device is configured to:
     receive, from the first remote access controller device, the locking key request information;
     determine that a second access path through the network to the key management system is unavailable;
     provide, in response to determining that the second access path is unavailable, the locking key request information to the tertiary locking key access device;
     receive, from the tertiary locking key access device, the locking key; and
     provide the locking key to the first remote access controller device.

2. The system of claim 1, wherein the secondary locking key access device is configured to:
   receive the locking key request information;
   retrieve, using the locking key request information and via a second access path through the network to the key management system, the locking key; and
   provide the locking key to the first remote access controller device.

3. The system of claim 1, wherein the secondary locking key access device is provided by a second server device, and wherein the second server device includes a second remote access controller device that is configured to receive the locking key request information, retrieve the locking key, and provide the locking key to the first remote access controller device.

4. The system of claim 1, wherein the first communication subsystem is a wired communication subsystem, and wherein the second communication subsystem is a wireless communication subsystem.

5. The system of claim 1, wherein the first remote access controller device is configured to:
   identify, prior to receiving the request to unlock the managed device, the secondary locking key access device as providing a second access path to the key management system;
   store, in response to identifying the secondary locking key access device as providing the second access path, a secondary locking key access device identifier in a key management database; and
   select, via the secondary locking key access device identifier in the key management database in response to determining that the first access path is unavailable, the secondary locking key access device for providing the second access path to the key management system.

6. The system of claim 1, wherein the first remote access controller device is configured to:
authenticate the locking key received from the secondary locking key access device; and
unlock, in response to authenticating the locking key, the managed device using the locking key.

7. An Information Handling System (IHS), comprising:
a processing system; and
a memory system that is coupled to the processing system and that includes instructions that, when executed by the processing system, cause the processing system to provide a remote access controller engine that is configured to:
identify a secondary locking key access device as providing a second access path to a key management system;
store, in response to identifying the secondary locking key access device as providing the second access path, a secondary locking key access device identifier in a key management database;
receive a request to unlock a managed device;
determine that a first access path through a network to the key management system, which is available via a first communication subsystem that is coupled to the processing system, is unavailable;
select, via the secondary locking key access device identifier in the key management database in response to determining that the first access path is unavailable, the secondary locking key access device for providing the second access path to the key management system;
provide, in response to determining that the first access path is unavailable, first locking key request information to the secondary locking key access device via a second communication subsystem that is coupled to the processing system, wherein the first locking key information is configured to provide for retrieval of a locking key for the managed device from the key management system;
receive, from the secondary locking key access device via the second communication subsystem, the locking key; and
unlock the managed device using the locking key.

8. The IHS of claim 7, wherein the secondary locking key access device is provided by a wireless networking device.

9. The IHS of claim 7, wherein the secondary locking key access device is provided by a server device.

10. The IHS of claim 7, wherein the first communication subsystem is a wired communication subsystem, and wherein the second communication subsystem is a wireless communication subsystem.

11. The IHS of claim 7, wherein the remote access controller engine is configured to:
authenticate the locking key received from the secondary locking key access device; and
unlock, in response to authenticating the locking key, the managed device using the locking key.

12. A method for providing secondary access to a locking key, comprising:
receiving, by a first server device, a request to unlock a managed device included in the first server device;
determining, by the first server device, that a first access path that is provided via a first communication subsystem in the first server device and through a network to a key management system is unavailable;
providing, by the first server device in response to determining that the first access path is unavailable, locking key request information to a secondary locking key access device via a second communication subsystem in the first server device, wherein the locking key request information is configured to provide for retrieval of a locking key for the managed device from the key management system;
receiving, by the first server device from the secondary locking key access device via the second communication subsystem, the locking key;
authenticating, by the first server device, the locking key received from the secondary locking key access device; and
unlocking, by the first server device in response to authenticating the locking key, the managed device using the locking key.

13. The method of claim 12, wherein the secondary locking key access device is provided by a wireless networking device.

14. The method of claim 12, wherein the secondary locking key access device is provided by a server device.

15. The method of claim 12, wherein the first communication subsystem is a wired communication subsystem, and wherein the second communication subsystem is a wireless communication subsystem.

16. The method of claim 12, further comprising:
identifying, by the first server device prior to receiving the request to unlock the managed device, the secondary locking key access device as providing a second access path to the key management system;
storing, by the first server device in response to identifying the secondary locking key access device as providing the second access path, a secondary locking key access device identifier in a key management database; and
selecting, by the first server device via the secondary locking key access device identifier in the key management database in response to determining that the first access path is unavailable, the secondary locking key access device for providing the second access path to the key management system.

17. The method of claim 12, further comprising:
receiving, by the secondary locking key access device from the first server device, the locking key request information;
determining, by the secondary locking key access device, that a second access path through the network to the key management system is unavailable;
providing, by the secondary locking key access device in response to determining that the second access path is unavailable, the locking key request information to a tertiary locking key access device;
receiving, by the secondary locking key access device from the tertiary locking key access device, the locking key; and
providing, by the secondary locking key access device, the locking key to the first server device.

* * * * *